(12) United States Patent
Badar (10) Patent No.: US 10,972,294 B2
(45) Date of Patent: Apr. 6, 2021

(54) ONLINE CHARGING FOR MULTI-USER AGENT INSTANCES SERVED BY DIFFERENT TELEPHONY APPLICATION SERVERS

(71) Applicant: T-Mobile USA, Inc., Bellevue, WA (US)

(72) Inventor: Saqib Badar, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/393,713

(22) Filed: Apr. 24, 2019

(65) Prior Publication Data

US 2019/0349209 A1 Nov. 14, 2019

Related U.S. Application Data

(60) Provisional application No. 62/669,864, filed on May 10, 2018.

(51) Int. Cl.
*H04L 12/14* (2006.01)
*H04L 29/06* (2006.01)

(52) U.S. Cl.
CPC ...... *H04L 12/1403* (2013.01); *H04L 65/1006* (2013.01); *H04L 65/1046* (2013.01); *H04L 65/1069* (2013.01); *H04L 65/1073* (2013.01)

(58) Field of Classification Search
CPC ............. H04L 12/1403; H04L 65/1006; H04L 65/1073; H04L 65/1069; H04L 65/1046; H04L 65/1063; H04L 12/14; H04M 15/8228; H04M 15/765; H04M 15/77; H04M 15/771; H04M 15/7652; H04M 15/751; H04M 15/57; H04M 15/63; H04M 15/51; H04M 17/02; H04M 15/66; H04M 15/64; H04M 15/00; H04W 4/24
See application file for complete search history.

(56) References Cited

U.S. PATENT DOCUMENTS

| | | | |
|---|---|---|---|
| 2011/0035336 A1* | 2/2011 | Cai ...................... | H04M 15/81 705/400 |
| 2016/0100063 A1* | 4/2016 | Tasker ................. | H04M 15/83 455/407 |

* cited by examiner

*Primary Examiner* — Marisol Figueroa
(74) *Attorney, Agent, or Firm* — Lee & Hayes, P.C.

(57) ABSTRACT

Techniques for allowing access based online charging in cases of multiple user agents (multi-UAs) scenarios where the instances are registered to different telephony application servers (TASs) are discussed herein. For example, a user device may support a native number and multiple virtual numbers linked via a user account. When servicing a call, the user device may determine a served number to service the call from. If the served number is not the native number but a virtual number, the native-line server may handle the call session, but the online charging session will be handled by the virtual-line server. The native-line server may use session initiation protocol (SIP) information to send updated information for charging parameters to the virtual-line server including network access transfer for accuracy in online charging logic.

20 Claims, 5 Drawing Sheets

```
┌─────────────────────────────────────────────────┐
│ ESTABLISH, VIA A FIRST NETWORK, A CONNECTION    │
│            WITH A USER EQUIPMENT                │
│                      402                        │
└─────────────────────────────────────────────────┘
                        ↓
┌─────────────────────────────────────────────────┐
│ RECEIVE, FROM THE USER EQUIPMENT, A FIRST       │
│ REQUEST TO INITIATE A COMMUNICATION SESSION     │
│ WITH FIRST SESSION INFORMATION INCLUDING        │
│ INSTANCE INFORMATION, FIRST NETWORK             │
│ INFORMATION, A SERVED NUMBER, AND A             │
│ CALLED-PARTY NUMBER                             │
│                      404                        │
└─────────────────────────────────────────────────┘
                        ↓
┌─────────────────────────────────────────────────┐
│ DETERMINE THAT THE USER EQUIPMENT IS            │
│ ASSOCIATED WITH A NATIVE NUMBER AND A VIRTUAL   │
│ NUMBER, WHEREIN THE NATIVE NUMBER IS            │
│ ASSOCIATED WITH A FIRST SERVICE PROVIDER AND    │
│ THE VIRTUAL NUMBER IS ASSOCIATED WITH A         │
│ SECOND SERVICE PROVIDER                         │
│                      406                        │
└─────────────────────────────────────────────────┘
                        ↓
┌─────────────────────────────────────────────────┐
│ DETERMINE THE SERVED NUMBER IS THE VIRTUAL      │
│ NUMBER BASED AT LEAST IN PART ON THE SESSION    │
│ INFORMATION                                     │
│                      408                        │
└─────────────────────────────────────────────────┘
                        ↓
┌─────────────────────────────────────────────────┐
│ TRANSMIT, TO ONE OR MORE COMPUTING DEVICES      │
│ ASSOCIATED WITH THE SECOND SERVICE PROVIDER,    │
│ AN AUTHORIZATION REQUEST TO INITIATE THE        │
│ COMMUNICATION SESSION WITH THE FIRST SESSION    │
│ INFORMATION                                     │
│                      410                        │
└─────────────────────────────────────────────────┘
                        ↓
┌─────────────────────────────────────────────────┐
│ RECEIVE, FROM THE USER EQUIPMENT, A SECOND      │
│ REQUEST WITH SECOND SESSION INFORMATION TO      │
│ CHANGE NETWORK TO A SECOND NETWORK              │
│                      412                        │
└─────────────────────────────────────────────────┘
                        ↓
┌─────────────────────────────────────────────────┐
│ TRANSMIT, TO THE ONE OR MORE COMPUTING          │
│ DEVICES, THE SECOND SESSION INFORMATION         │
│ INCLUDING SECOND NETWORK INFORMATION            │
│                      414                        │
└─────────────────────────────────────────────────┘
```

```
┌─────────────────────────────────────────────────────────────┐
│ RECEIVE FIRST SESSION INFORMATION OF A COMMUNICATION SESSION │
│   FOR A USER EQUIPMENT, WHEREIN THE FIRST SESSION INFORMATION │
│     INCLUDES CHARGING INFORMATION AND A SERVED NUMBER        │
│                            502                               │
└─────────────────────────────────────────────────────────────┘
                              ↓
┌─────────────────────────────────────────────────────────────┐
│    DETERMINE A RATING FUNCTION FOR THE COMMUNICATION SESSION │
│       BASED AT LEAST IN PART ON THE FIRST SESSION INFORMATION │
│                            504                               │
└─────────────────────────────────────────────────────────────┘
                              ↓
┌─────────────────────────────────────────────────────────────┐
│      GENERATE AN ONLINE CHARGING SESSION USING THE RATING    │
│                           FUNCTION                           │
│                            506                               │
└─────────────────────────────────────────────────────────────┘
                              ↓
┌─────────────────────────────────────────────────────────────┐
│      RECEIVE SECOND SESSION INFORMATION OF THE COMMUNICATION │
│                 SESSION FOR THE USER EQUIPMENT               │
│                            508                               │
└─────────────────────────────────────────────────────────────┘
                              ↓
┌─────────────────────────────────────────────────────────────┐
│   DETERMINE THE SECOND SESSION INFORMATION INCLUDES A CHANGE │
│                  IN THE CHARGING INFORMATION                 │
│                            510                               │
└─────────────────────────────────────────────────────────────┘
                              ↓
┌─────────────────────────────────────────────────────────────┐
│       DETERMINE TO UPDATE THE RATING FUNCTION FOR THE        │
│  COMMUNICATION SESSION BASED AT LEAST IN PART ON THE CHANGE  │
│                  IN THE CHARGING INFORMATION                 │
│                            512                               │
└─────────────────────────────────────────────────────────────┘
                              ↓
┌─────────────────────────────────────────────────────────────┐
│      UPDATE THE ONLINE CHARGING SESSION USING THE RATING     │
│                           FUNCTION                           │
│                            514                               │
└─────────────────────────────────────────────────────────────┘
```

FIG. 5

ONLINE CHARGING FOR MULTI-USER AGENT INSTANCES SERVED BY DIFFERENT TELEPHONY APPLICATION SERVERS

The present application claims the benefit of U.S. Provisional Patent Application No. 62/669,864 filed May 10, 2018, which is incorporated herein by reference in its entirety as if fully set forth herein.

BACKGROUND

Traditionally, a single mobile phone is associated with a single number. However, as the number of mobile phones, each with a different number and/or service provider, associated with a single user has grown over time, service providers may allow multiple numbers to be linked by a single user account, which may be registered on multiple devices.

Many user devices configured for telecommunications ("terminals"), such as smartphones, are capable of communicating via various types of networks. For example, cellular and other portable terminals may connect with circuit-switched (CS) networks such as the Global System for Mobile Communications (GSM) or more recent packet-switched (PS) networks such as Long Term Evolution (LTE) or other Internet Protocol (IP)-based networks. In addition to the types of networks, the user devices may also be configured to work with various types of service plans. For example, the user device may use a subscription service or a prepaid service. Online charging is used to charge the prepaid services. However, with multiple numbers and various types of networks, determining which service provider to charge and the amount to charge may depend on the served number and network access type.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems, devices, and methods are directed to online charging for multi-user agent instances served by different telephony application servers (TASs). Online charging is used to charge the prepaid services. The multi-user agents (UAs) may include a single number associated with multiple devices (multi SIM) or multiple numbers linked via the same account and registered on multiple devices (native/virtual lines). For instance, a user may have a prepaid personal cellphone with a native cellphone number. This user may register a user account with a service provider to include the native cellphone number, a virtual home number, and a virtual work number. If the user is trying to make a work-related phone call and wishes to have the virtual work number appear as the served number, the user may select the virtual work number on the phone application to place the call with the work number. Alternatively, and/or additionally, if the user is receiving an incoming work-related phone call directed to the virtual work number, the phone application on the cellphone may serve the call with the virtual work number. In the present example, because the virtual work number is the controlling number, the charges accrued for the phone call will be charged against the work account rather than the native cellphone account. If the work account is also a prepaid service account, then the service provider for the work account needs to keep track of ongoing charges to make sure there are enough credits to continue the call. Additionally, if the user is moving from one location to another, which may result in an increase or a decrease in the charging rate (e.g., moving from VoWifi to VoLTE or vice versa), the service provider for the work account may also need to know about any such changes in the charging rate.

For example, the user may have a prepaid personal cellphone registered with Service Provider A and the user's work account may be registered with Service Provider B. In this example, if the user wishes to place a work-related call from his or her personal cellphone and have the call originate from his or her work account, the cellphone may initiate communication with the native account provider, which in this case is Service Provider A. The user's personal cellphone may provide ongoing session initiation protocol (SIP) messages to Service Provider A to initiate and maintain the call. The SIP message may contain charging parameters to serve the communication session including but not limited to: virtual line association with native line information, SIP instance information, access network information, visited network information, user equipment time zone information, Cell Global Identity (CGI) of the device, International Mobile Equipment Identity (IMEI) of the device, called-party-address as Circuit-Switched Routing Number (CSRN), and session description protocol (SDP). Once Service Provider A has determined that this call is not served from its native account, it may contact Service Provider B and provide ongoing SIP information for Service Provider B to initiate and maintain online charging for the call session. In this example, because Service Provider A is connected to the personal cellphone and thus receiving the ongoing SIP information, Service Provider A would have to relay the ongoing SIP information to Service Provider B in order to correctly handle the online charging. Accordingly, if the user travels with the cellphone and moves from a first network access type to a second network access type, such as from VoLTE to VoWifi (or vice versa), Service Provider B can update the rating function for online charging. For instance, Service Provider B can update the rating function to drop the higher charging rate for VoLTE to a lower charging rate for VoWifi.

In some examples, wireless communication situations may arise involving a duplicate line or a virtual line for which the instances are registered in different a Telephony Application Server (TAS) than the TAS that includes the wireless subscriber's profile. In such situations, the TAS that has the profile may establish the charging session (e.g., Ro session), while procedures, such as, for example, Single Radio Voice Call Continuity (SRVCC) and Circuit Switch Retry (CSRetry), may be handled by the TAS that serves the underlying number.

There is a customized header in the Session Initiation Protocol (SIP) that the TAS may use to communicate the information from upstream to downstream. But there is no mechanism within a traditional telecommunications network in place where a downstream TAS may actually provide the information to an upstream TAS. Such a flow may be an addition that may help charging of customers accurately and gives opportunities for more business logic that a wireless network may support to provide such services.

An IP Multimedia Subsystem (IMS) network may support calls to multi-user agents (UAs) where the called number may be one of: (1) a single number associated with multiple devices (multi SIM); or (2) multiple numbers linked via the same account and registered on multiple devices (native/virtual lines). In both cases, instances can be registered into different Telephony Application Servers (TASs). Accordingly, TAS nodes assume different roles depending whether the user device is supporting calls associated with a native number or a virtual number. These different roles include handling access domain changes, handling different call types (e.g., conference call, incoming call, etc.), and handling of supplementary services for the instances registered on the TAS nodes. For example, a virtual line may be physically associated with one SIM, but virtually may be registered on the other instances as well if allowed by the service subscription. In this case, the underlying instance of a virtual line can end up on different TAS nodes. A TAS which has information about all the registered instances for a telephone number, including virtual instances of that telephone number, may, for example, control the call forking mechanism in cases of incoming calls, handle supplementary services for the user based on the profile and service subscription, etc. For example, such a TAS may be referred to as a Controller TAS or C-TAS. However, procedures such as Single Radio Voice Call Continuity (VCC) (SRVCC) or Circuit Switched (CS) Retry (e.g., in the case of a terminating call that couldn't be completed in the Packet Switched (PS) domain) may be handled by the underlying device number Service Centralization and Continuity Application Server (SCC-AS), which may be an integrated module in the TAS. For example, this may be referred to as the Underlying TAS or U-TAS.

The introduction of online charging for service in an IMS network may become more challenging for implemented-services that are handled by a number of devices for different sets of TAS nodes in the network. In particular, a TAS may need to have an integrated module to act as a diameter client (diameter protocol 3GPP) for establishing a diameter session with an Online Charging System (OCS) over a diameter Ro/Gy interface. Additionally, the TAS may need to perform quota management based on a response from the OCS. An example of implemented-services may include mobility management telephone services that are handled by separate TASs rather than SRVCC/CS Retry procedures.

In some instances, the systems, devices, and techniques described herein allow for access based online charging in cases of multi UA scenarios where the instances are registered in different TASs. The system allows the native line TAS to provide updated SIP information to the virtual line TAS, which improves the accuracy in the charging logic because the virtual line TAS is using the updated information for charging parameters including access network, visited network, user equipment time zone, and Cell Global Identity (CGI) to determine the correct rate. For instance, ongoing session updates can be communicated to improve the accuracy for online charging by determining the appropriate charging rate based on a current access type such as VoLTE, VoNR, VoWifi, and CS, rather than only based on the initial access type, etc. Additionally, because online charging may be used for prepaid accounts, the system may correctly determine if the account is low on funds and correctly determine if the call session needs to be terminated. These and other improvements to the functioning of a computer and network are discussed herein.

The systems, devices, and techniques described herein can be implemented in a number of ways. Example implementations are provided below with reference to the following figures.

Figure 1:
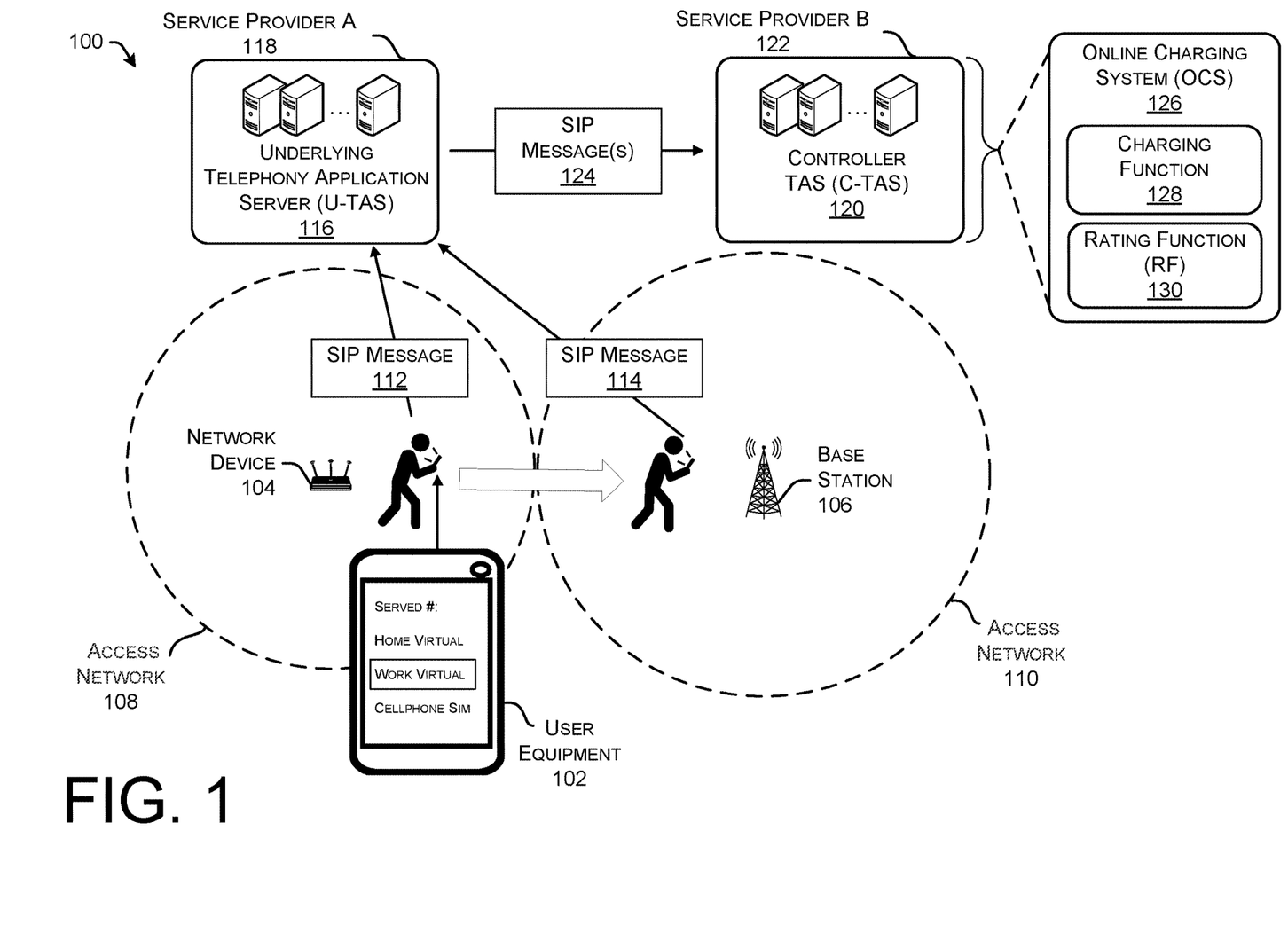
FIG. 1 illustrates an example system for implementing online charging for multi-user agent instances served by different telephony application servers (TASs), according to some implementation.

FIG. 1 illustrates an example system 100 for implementing online charging for multi-user agent instances served by different telephony application servers (TASs), according to some implementations. As shown in FIG. 1, the system 100 may include a user equipment (UE) 102, a network device 104, and base station 106. In some examples, the network device 104 and the base station 106 may be associated with access networks 108 and 110, respectively. In some instances, the system 100 may include functionality for implementing online charging for multi-user agent instances served by Underlying Telephony Application Server (U-TAS) 116 associated with Service Provider A 112 and Controller Telephony Application Server (C-TAS) 120 associated with Service Provider B 122, in accordance with embodiments of the disclosure.

Examples of the user equipment (UE) 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 102 include, but are not limited to, smart devices such as televisions, music players, or any other electronic appliances that can generate, request, receive, transmit, or exchange voice, video, and/or digital data over a network.

The user equipment (UE) 102 can further be configured to establish or receive a communication session, such as a VoLTE, VoNR, VoWifi, or other voice call, a video call, or another sort of synchronous communication. Establishment of such sessions can involve communication clients and Session Initiation Protocol (SIP) clients to communicate with the telecommunications network. The UE 102 can communicate ongoing SIP messages (e.g., SIP Message 112 and SIP Message 114) to the Underlying Telephone Application Server (U-TAS) 116 to provide updated information for charging parameters to determine correct charging. For instance, the UE 102 may send SIP Message 112 to the U-TAS 116 when initiating a call session. Then the user moves with the UE 102 from one location to the next, thus switching from Access Network 108 to Access Network 110. In connection with the handover from the Access Network 108 to the Access Network 110, the UE 102 may send SIP Message 114 with different access network information to the U-TAS 116. Additional information to be received and transmitted by the UE 102 in implementing online charging for multi-user agent instances served by different TAS is discussed below in FIG. 2, as well as throughout this disclosure.

In general, the network device 104 can be implemented as a variety of technologies to provide wired and/or wireless access to various types of networks for transmitting and receiving data (e.g., data packets), including networks using technologies such as Institute of Electrical and Electronics Engineers (IEEE) 802.11 ("WiFi"), IEEE 802.15.1 ("Bluetooth"), Asynchronous Transfer Mode (ATM), Internet Protocol (IP), and the like. The term "data network" may refer to the data packets that are transmitted and received within the networks. The data packets may be used to carry voice traffic using VoIP or other technologies as well as data traffic. Moreover, the network devices 104 may communicatively couple to a telephony application server (TAS) in any manner, such as by a wired or wireless connection. The network device 104 can be associated with access network 108.

In general, the base station 106 can be implemented as a variety of technologies to provide wired and/or wireless access to the network, as discussed herein. In some instances, the base station 106 can include a 3GPP RAN, such a GSM/EDGE RAN (GERAN), a Universal Terrestrial RAN (UTRAN), an evolved UTRAN (E-UTRAN), or a New Radio (5G) RAN, or alternatively, a "non-3GPP" RAN, such as a Wi-Fi RAN, or another type of wireless local area network (WLAN) that is based on the IEEE 802.11 standards. Further, the base station 106 can include any number and type of transceivers and/or base stations representing any number and type of macrocells, microcells, picocells, or femtocells, for example, with any type or amount of overlapping coverage or mutually exclusive coverage. The base station 106 can be associated with access network 110.

The access network 108 and 110 can be any sort of access network 108 and 110, such as a GSM or UMTS network. The access network 108 and 110 can include any aspects of one or more of second, third, fourth generation, and fifth generation (2G, 3G, 4G, and 5G) cellular-wireless access technologies. The access network 108 and 110 can also be referred to as a universal terrestrial radio network (UTRAN) or a GSM EDGE radio access network (GERAN) and can include a base station, as well as a radio network controller (RNC).

The online charging system (OCS) 126 may include the charging function 128 and the rating function (RF) 130. By way of example, the online charging system 126 can determine the online charging for the call served from a virtual number from the user equipment 102. Considering an example where the UE 102 is moving from a first access network 108 to a second access network 110, and the call is served from a virtual work number, online charging for multi-user agent instances served by different telephony application servers may be determined, as discussed herein.

At a first time, the UE 102 is in communication with U-TAS 116 through the network device 104. The UE 102 can transmit the SIP Message 112 to the U-TAS 116 to provide the information required for initiating the communication session including the charging information based on the current access network information. At a time after the first time, the UE 102 has moved and is in communication with the U-TAS 116 through the base station 106. The U-TAS 116 may transmit SIP Message(s) 124 to inform the C-TAS 120 of information required to correctly determine the online charging. Additional information to be received and transmitted by the U-TAS 116 and the C-TAS 120 for implementing online charging for multi-user agent instances is discussed below in FIG. 3, as well as throughout this disclosure.

In some instances, the environment 100 can further include one or more communication servers, including U-TAS 116 and C-TAS 120, to facilitate communications by and between the various devices in the environment 100. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the environment 100 may implement GSM, UMTS, and/or LTE/LTE Advanced telecommunications technologies. The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the network device 104, the base station 106, and one or more endpoints of the network (e.g., U-TAS 116, C-TAS 120, servers, websites, etc.). While FIG. 1 illustrates the example environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

In some instances, the user equipment 102 can communicate with any number of user equipment, servers, network devices, computing devices, and the like.

Figure 2:
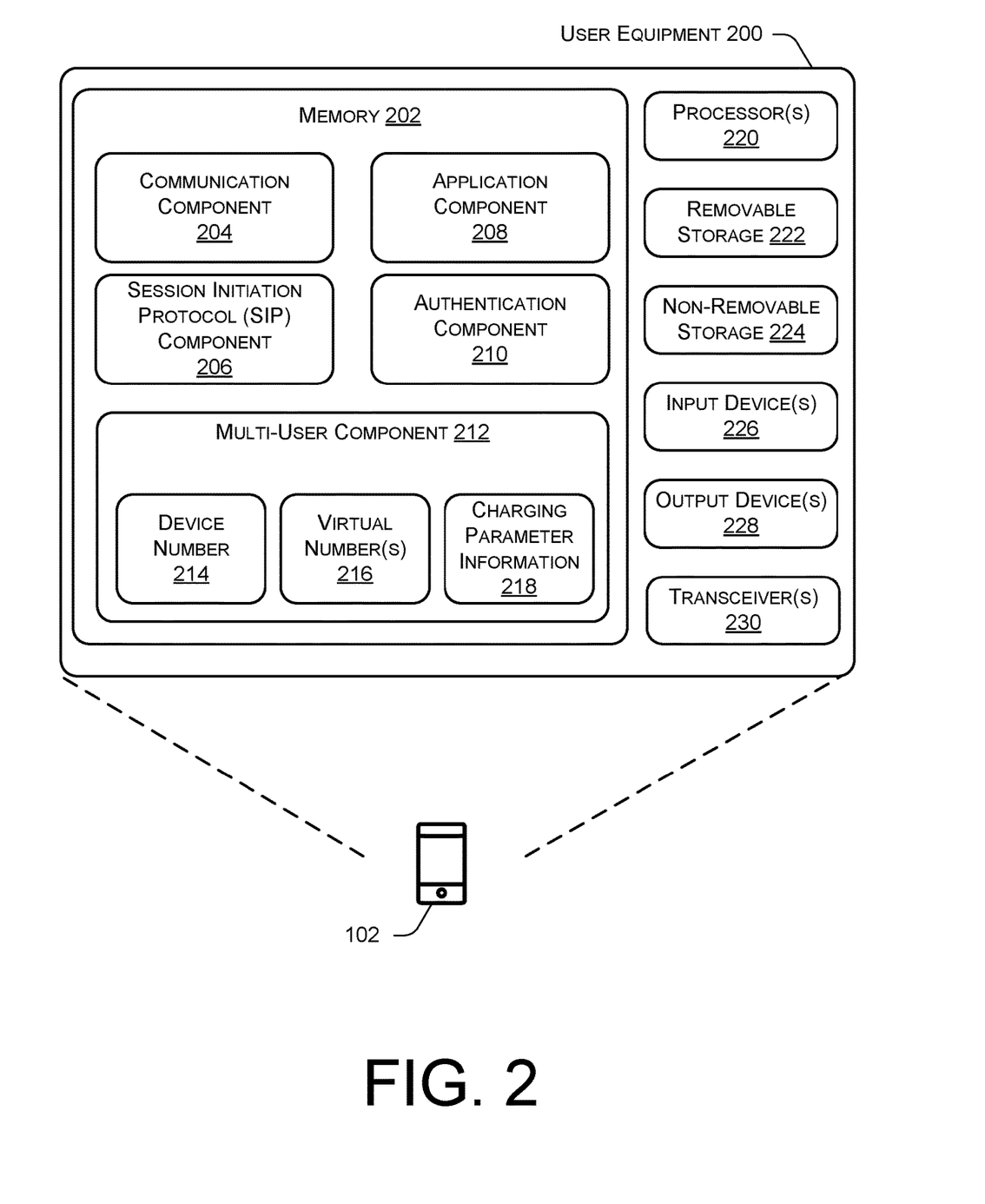
FIG. 2 illustrates an example user device configured to implement online charging for multi-user agent instances, according to some implementation.

FIG. 2 illustrates an example user equipment (UE) 200 configured to implement online charging for multi-user agent instances, in accordance with embodiments of the disclosure. In some embodiments, the UE 200 can correspond to the UE 102 of FIG. 1. It is to be understood in the context of this disclosure that the UE 200 can be implemented as a single device or as a plurality of devices with components and data distributed among them.

As illustrated, the UE 200 comprises a memory 202 storing the communication component 204, a session initiation protocol (SIP) component 206, an application component 208, an authentication component 210, and a multi-user component 212. The multi-user component 212 further includes the device number 214, the virtual number(s) 216, and the charging parameter information 218. Also, the UE 200 includes processor(s) 220, a removable storage 222 and non-removable storage 224, input device(s) 226, output device(s) 228, and transceiver(s) 230.

In various embodiments, the memory 202 is volatile (such as RAM), non-volatile (such as ROM, flash memory, etc.) or some combination of the two. The communication component 204, the SIP component 206, the application component 208, the authentication component 210, and the multi-user component 212 stored in the memory 202 can comprise methods, threads, processes, applications, or any other sort of executable instructions. The communication component 204, the SIP component 206, the application component 208, the authentication component 210, and the multi-user component 212 can also include files and databases.

The communication component 204 may include functionality to send and receive communication (e.g., a voice call, an SMS, or an MMS) and/or determine when to transition an existing communication from one access network to another. In some examples, the communication component 204 may perform a number of functions, such as interfacing with the transceiver(s) 230, preparing the user equipment 200 to receive or handover a call, tuning the transceiver(s) 230, receiving and processing an invitation message such as a SIP Message 112 and/or 114 received via the transceiver(s) 230, transmitting a preconditions message such as a SIP Message 112 and/or 114 response via the transceiver(s) 230, detecting a failure condition, and the like. For instance, the communication component 204 may determine that a connection to an unlicensed data network is of sufficient quality to handle a voice call and/or a video call.

The SIP component 206 may be an application that enables calls to be served via Voice over Internet Protocol (VoIP) using Session Initiation Protocol (SIP) signaling. The SIP component 206 may determine a current location of the user equipment 200 using a Global Positioning System (GPS). The current location may determine the phone mode. For example, if the current location of the user equipment 200 is within a geographic area in which a carrier, associated with a device number 214 of the user equipment 200, provides coverage, then the phone mode may be set to carrier mode. If the current location of the user equipment 200 is in a geographic area in which the carrier does not provide coverage (e.g., a location in which a wireless phone associated with the device number 214 would normally roam), then the phone mode may be set to Over-The-Top (OTT) mode. The SIP component 206 may transmit SIP message containing information for charging parameters to serve (e.g., initiate, receive, maintain, update, terminate, etc.) a communication session including but not limited to: virtual line association with native line information, SIP instance information, access network information, visited network information, user equipment time zone information, Cell Global Identity (CGI) of the device, International Mobile Equipment Identity (IMEI) of the device, called-party-address as Circuit-Switched Routing Number (CSRN), and session description protocol (SDP).

The application component 208 may display various information associated with serving a call. In various examples, the application component 208 may interact with the multi-user component 212 to serve (e.g., initiate, receive, update, terminate, etc.) calls with one or more virtual numbers. In addition to being used as a conventional 10-digit native phone number, the device number 214 may also be used as a Uniform Resource Identifier (URI), e.g., as an Internet Protocol (IP) Multimedia Private Identity (IMPI), a unique permanently allocated global identity assigned by a home network operator (e.g., the carrier).

The application component 208 may provide a portal for the user to sign up for services with a service provider (e.g., Service Provider A 118, Service Provider B 122). In various examples, the application component 208 may provide an interface for the user(s) to register new user accounts and download one or more applications associated with the service provider, such as the authentication component 210 or the multi-user component 212. The application component 208 may communicate with servers of the service provider for the user equipment(s) 102 through the communication component 204 to receive or update user settings. After creating a user account to access telephony service with the application component 208, a user may interact with the application component 208 to access services associated with the service provider, such as the multi-user component 212, to actively manage user account including adding or deleting linked phone numbers, users, or computing devices.

The authentication component 210 may perform various types of authentication. The authentication component 210 may interact with the database(s) to store, retrieve, and update the database(s) containing user subscription information, including items such as user identification and addressing (e.g., the IMSI (International Mobile Subscriber Identity) and MSISDN (Mobile Subscriber ISDN Number)), user profile information (e.g., subscription data). The authentication component 210 may also be configured to perform other operations.

Initially, the authentication component 210 may interact with the application component 208 and/or the communication component 204 to provide an interface for a user to register a new user account. As part of registration, the authentication component 210 may determine whether a user authorized to use the service provided by a service provider. After the user account is created, the authentication component 210 may provide one or more options to link phone numbers to the user account. In some examples, the authentication component 210 may interact with a database to retrieve and provide the list of phone numbers that the user is authorized use with the service provider. Additionally, and/or alternatively, the authentication component 210 may provide options for the user to manually link phone numbers (by devices or MSISDN). While linking the phone numbers, a user may assign a name to each phone number to enable the user to remember the accounts, and the authentication component 210 may save the user account information and settings to the database. After the user has installed the communication component 204 to their UE 200, the authentication component 210 may authenticate the UE 200 to send and receive communication using a user account. Upon a restart of the UE 200, the communication component 204 may automatically send a request to the authentication component 210 again to authenticate the UE 200 and reconnect the UE 200 to send and receive communication through the service provider.

The multi-user component 212 may include the device number 214, the virtual number(s) 216, and the charging parameter information 218. As described herein, the multi-user component 212 may be created by the application component 208. The multi-user component 212 may interact with the SIP component 206 to generate session information for multi-agent call including serving a call with a virtual number and providing the updated charging parameter information 218 for correct online charging.

The virtual number(s) 216 may be number(s) associated with to a user of the UE 200 or another user borrowing the UE 200 to originate a call with. The virtual number(s) 216 may be tied to a particular user account and the particular user may log into the particular user account (e.g., through application component 208) from the UE 200, and select the virtual number(s) 216 to place the call with. If the virtual number is selected as the served number, the virtual number(s) 216 is the phone number, associated with a user account, to which the call is placed from and to charge the call to.

In some embodiments, the processor(s) 220 is a central processing unit (CPU), a graphics processing unit (GPU), or both CPU and GPU, or other processing unit or component known in the art.

The UE 200 also includes additional data storage devices (removable and/or non-removable) such as, for example, magnetic disks, optical disks, or tape. Such additional storage is illustrated in FIG. 2 by removable storage 222 and non-removable storage 224. Tangible computer-readable media can include volatile and nonvolatile, removable and non-removable media implemented in any method or technology for storage of information, such as computer readable instructions, data structures, program modules, or other data. The memory 202, the removable storage 222 and the non-removable storage 224 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the UE 200. Any such tangible computer-readable media can be part of the UE 200.

The UE 200 can include input device(s) 226, such as a keypad, a cursor control, a touch-sensitive display, etc. Also, the UE 200 can include output device(s) 228, such as a display, speakers, etc. These devices are well known in the art and need not be discussed at length here.

As illustrated in FIG. 2, the UE 200 can include one or more wired or wireless transceiver(s) 230. In some wireless embodiments, to increase throughput, the transceiver(s) 230 can utilize multiple-input/multiple-output (MIMO) technology. The transceiver(s) 230 can be any sort of wireless transceivers capable of engaging in wireless, radio frequency (RF) communication, as discussed herein. The transceiver(s) 230 can also include other wireless modems, such as a modem for engaging in Wi-Fi, WiMAX, Bluetooth, infrared communication, or the like.

Figure 3:
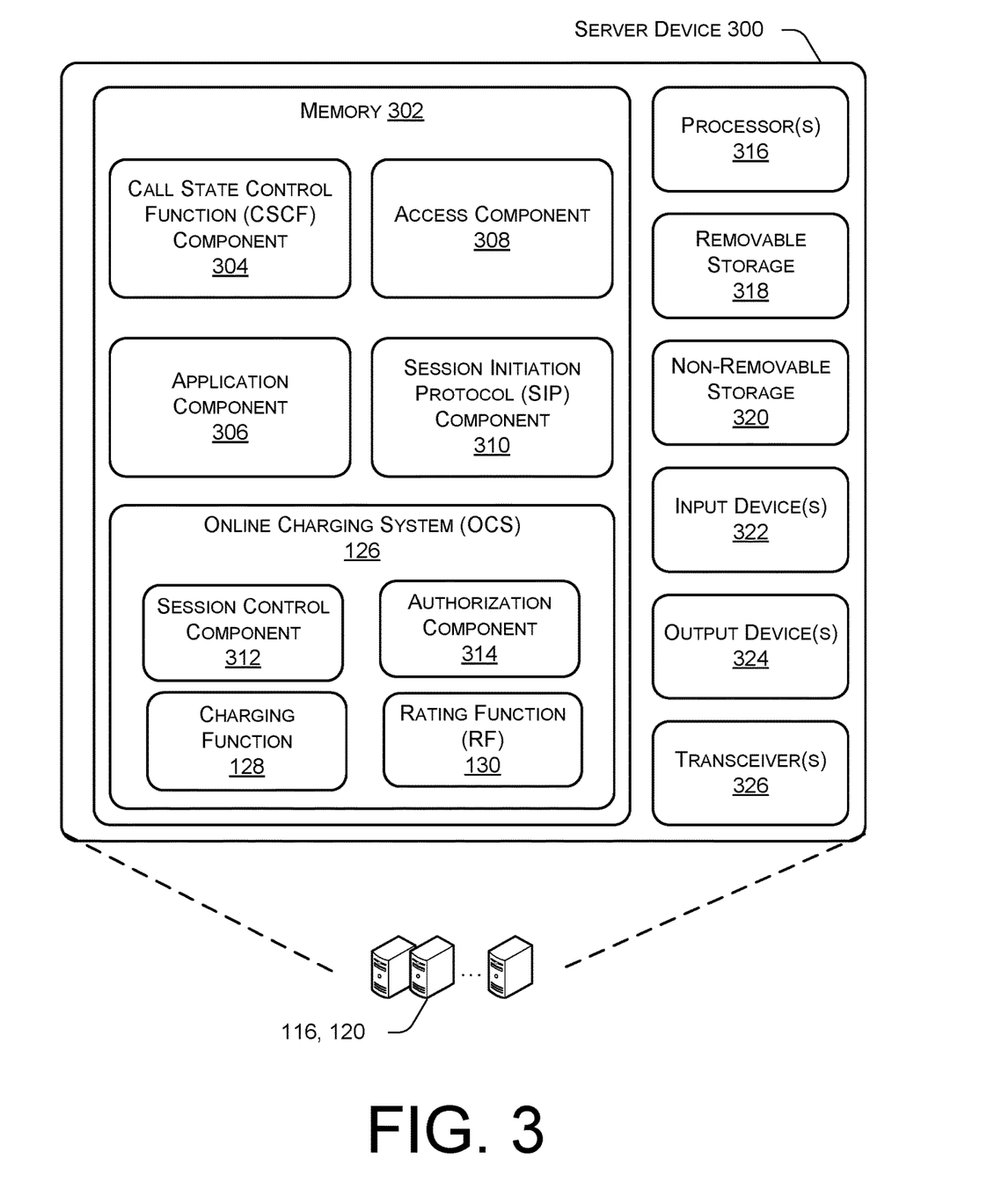
FIG. 3 illustrates an example server device configured to implement online charging for multi-user agent instances, according to some implementation.

FIG. 3 illustrates an example server device 300 configured to implement online charging for multi-user agent instances, in accordance with embodiments of the disclosure. In some embodiments, the server device 300 can correspond to the telephony application servers 116 and/or 120 of FIG. 1. It is to be understood in the context of this disclosure that the server device 300 can be implemented as a single device or as a plurality of devices with components and data distributed among them.

As illustrated, the server device 300 comprises a memory 302 storing the call state control function (CSCF) component 304, the application component 306, the access component 308, the session initiation protocol (SIP) component 310, and the online charging system (OCS) 126. The online charging system (OCS) 126 further includes the session control component 312, the authorization component 314, the charging function 128, and the rating function 130. Also, the server device 300 includes processor(s) 316, a removable storage 318 and non-removable storage 320, input device(s) 322, output device(s) 324, and transceiver(s) 326.

In various embodiments, the memory 302 is volatile (such as RAM), non-volatile (such as ROM, flash memory, etc.) or some combination of the two. The call state control function (CSCF) component 304, the application component 306, the access component 308, the SIP component 310, and the online charging system (OCS) 126 stored in the memory 302 can comprise methods, threads, processes, applications, or any other sort of executable instructions. The CSCF component 304, the application component 306, the access component 308, the SIP component 310, and the OCS 126 can also include files and databases.

The call state control function (CSCF) component 304 may include functionality to send and receive communication (e.g., a voice call, an SMS, or an MMS) and/or determine when to transition an existing communication from one access network to another. In some examples, the CSCF component 304 may perform a number of functions, such as interfacing with the transceiver(s) 326, preparing the user equipment 200 to receive or handover a call, tuning the transceiver(s) 326, receiving and processing a message such as a SIP Message 112 and/or 114 received via the transceiver(s) 326, transmitting a preconditions message such as a SIP Message(s) 124 response via the transceiver(s) 326, detecting a failure condition.

The application component 306 may serve as a portal for the user to sign up for services with a service provider (e.g., Service Provider A 118, Service Provider B 122). In various examples, the application component 306 may provide an interface for the user(s) to register new user accounts and download one or more applications associated with the service provider. The application component 306 may communicate with user equipment 102 and/or 200 to receive or update user settings. After creating a user account to access telephony service with the application component 306, a user may interact with the application component 306 through a service provider website or a service provider application to actively manage user account including adding or deleting linked phone numbers, users, or computing devices. The application component 306 may receive and store information for call forwarding, to route a call directed to a first number to another device associated with another number, or call forking, to route a call directed to a first number to multiple devices.

The access component 308 may handle incoming calls and route the call to the appropriate device. In various examples, the access component 308 interact with the application component 306 to determine call forwarding or forking based on the user account settings. The access component 308 may determine one or more user devices to route an incoming call to and transmit calls to the one or more user devices as designated by the user account.

The session initiation protocol (SIP) component 310 may be an application that utilize SIP information (SIP INFO) and/or SIP message (SIP MESSAGE) for different telephony application servers (TASs) to communicate with other servers or user devices. The SIP information and/or SIP message may include information related to requests or methods for serving (e.g., initiating, receiving, maintaining, updating, terminating, etc.) communication sessions. In some examples, the SIP component 310 may perform different functions based on whether it is residing on a native line server or a virtual line server. For instance, the SIP component 310 residing on a native line server may handle underlying call functions such as initiating calls and terminating calls and communicating access network changes to the virtual line server. While, the SIP component 310 residing on a virtual line server may handle receiving access network changes to update the online charging session.

In various examples, the SIP component 310 may be utilized by a native line TAS to transmit SIP information to a virtual line TAS with changes in access network. The SIP component 310 may transmit SIP message containing information necessary to serve a communication session including but not limited to: virtual line association with native line information, SIP instance information, access network information, visited network information, user equipment time zone information, Cell Global Identity (CGI) of the device, International Mobile Equipment Identity (IMEI) of the device, called-party-address as Circuit-Switched Routing Number (CSRN), and session description protocol (SDP). In some examples, the SIP component 310 utilized by a native line TAS may send SIP message using SIP INFO or SIP MESSAGE method based on meeting one or more trigger conditions. In various examples, the one or more trigger conditions may include changes to one or more charging parameters including but not limited to a change in network access type, visited network information, user equipment time zone, or SRVCC condition.

In some examples, the SIP component 310 may be utilized by a virtual line TAS to receive updated SIP information and update the online charging system (OCS) 126 with the correct information for charging parameters for proper charging. The SIP component 310 may be utilized by a virtual line TAS to communicate information with authorizing the communication session using the online charging system 126. For instance, the virtual line TAS may initiate an online charging session and determine that the account associated with the virtual number has sufficient account balance to authorize a communication session for a call unit determined by a predetermined amount of time. However, if the account does not have sufficient account balance to authorize a new or ongoing communication session, the virtual line TAS may utilize the SIP information to communicate the insufficient account balance to authorize the initial or ongoing communication session.

The online charging system (OCS) 126 may include the session control component 312, the authorization component 314, the charging function 128, and the rating function (RF) 130. The online charging system 126 allows the server device 300 to act as a diameter client for the Ro interface which handles online charging sessions. The session control component 312 may initiate and update online charging sessions. The session control component 312 may interact with the SIP component 310 to transmit SIP information related to whether or not a communication session is authorized or should be terminated based on lack of call units.

The authorization component 314 interact with the charging function 128 to determine whether the user account associated with the served number has enough balance to initiate and/or maintain a communication session. The authorization component 314 interact with the database(s) to store, retrieve, and update the database(s) containing user account balance and subscription information, including items such as user identification and addressing (e.g., the IMSI (International Mobile Subscriber Identity) and MSISDN (Mobile Subscriber ISDN Number)), user profile information (e.g., subscription data). The authorization component 314 may also be configured to perform other operations.

The charging function 128 may include rules for charging session for a call based on the charging parameters. The charging function 128 may determine a rating function 130 to charge a user account based on SIP information received from SIP component 310. In some examples, the rating function 130 may determine the current rate for the ongoing charging session based on the charging parameters as described herein, including the current access network type (e.g., VoLTE, VoNR, VoWifi, CS, etc.). In an example, the rate function may determine to charge a first rate based on the first access network type such as VoLTE and to charge a second rate based on the second access network type such as VoWifi, and the second rate may be lower than the first rate. The charging function 128 may use the current rate as determined by the rating function 130 to determine an ongoing charge for the current communication session and charge the user account appropriately. The charging function 128 may continuously determine if a call unit is available to maintain the current communication session. The call unit may be a predetermined increment of time (e.g., 1 minute, 5 minutes, 10 minutes) that is pre-authorized to maintain communication session. For instance, the charging function 128 may pre-authorize a call unit of 5 minutes to initiate a communication session, once that 5 minutes is used up or close to used up, the charging function 128 may pre-authorize another call unit to maintain the communication session.

In some embodiments, the processor(s) 316 is a central processing unit (CPU), a graphics processing unit (GPU), or both CPU and GPU, or other processing unit or component known in the art.

The server device 300 also includes additional data storage devices (removable and/or non-removable) such as, for example, magnetic disks, optical disks, or tape. Such additional storage is illustrated in FIG. 3 by removable storage 318 and non-removable storage 320. Tangible computer-readable media can include volatile and non-volatile, removable and non-removable media implemented in any method or technology for storage of information, such as computer readable instructions, data structures, program modules, or other data. The memory 302, the removable storage 318 and the non-removable storage 320 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the server device 300. Any such tangible computer-readable media can be part of the server device 300.

The server device 300 can include input device(s) 322, such as a keypad, a cursor control, a touch-sensitive display, etc. Also, the server device 300 can include output device(s) 324, such as a display, speakers, etc. These devices are well known in the art and need not be discussed at length here. The server device 300 may be configured to communicate over a telecommunications network using any common wireless and/or wired network access technology. Moreover, the server device 300 may be configured to run any compatible device operating system (OS), including but not limited to, Microsoft Windows Mobile, Google Android, Apple iOS, Linux Mobile, as well as any other common mobile device OS.

The server device 300 also can include input device(s) 322, such as a keypad, a cursor control, a touch-sensitive display, voice input device, etc., and output device(s) 324 such as a display, speakers, printers, etc. These devices are well known in the art and need not be discussed at length here.

As illustrated in FIG. 3, the server device 300 also includes one or more wired or wireless transceiver(s) 326. For example, the transceiver(s) 326 can include a network interface card (NIC), a network adapter, a LAN adapter, or a physical, virtual, or logical address to connect to various network, network devices, the U-TAS 116, or the C-TAS 120 illustrated in the environment 100, for example. To increase throughput when exchanging wireless data, the transceiver (s) 326 can utilize multiple-input/multiple-output (MIMO) technology. The transceiver(s) 326 can comprise any sort of wireless transceivers capable of engaging in wireless, radio frequency (RF) communication. The transceiver(s) 326 can also include other wireless modems, such as a modem for engaging in Wi-Fi, WiMAX, Bluetooth, infrared communication, and the like.

Figure 4:
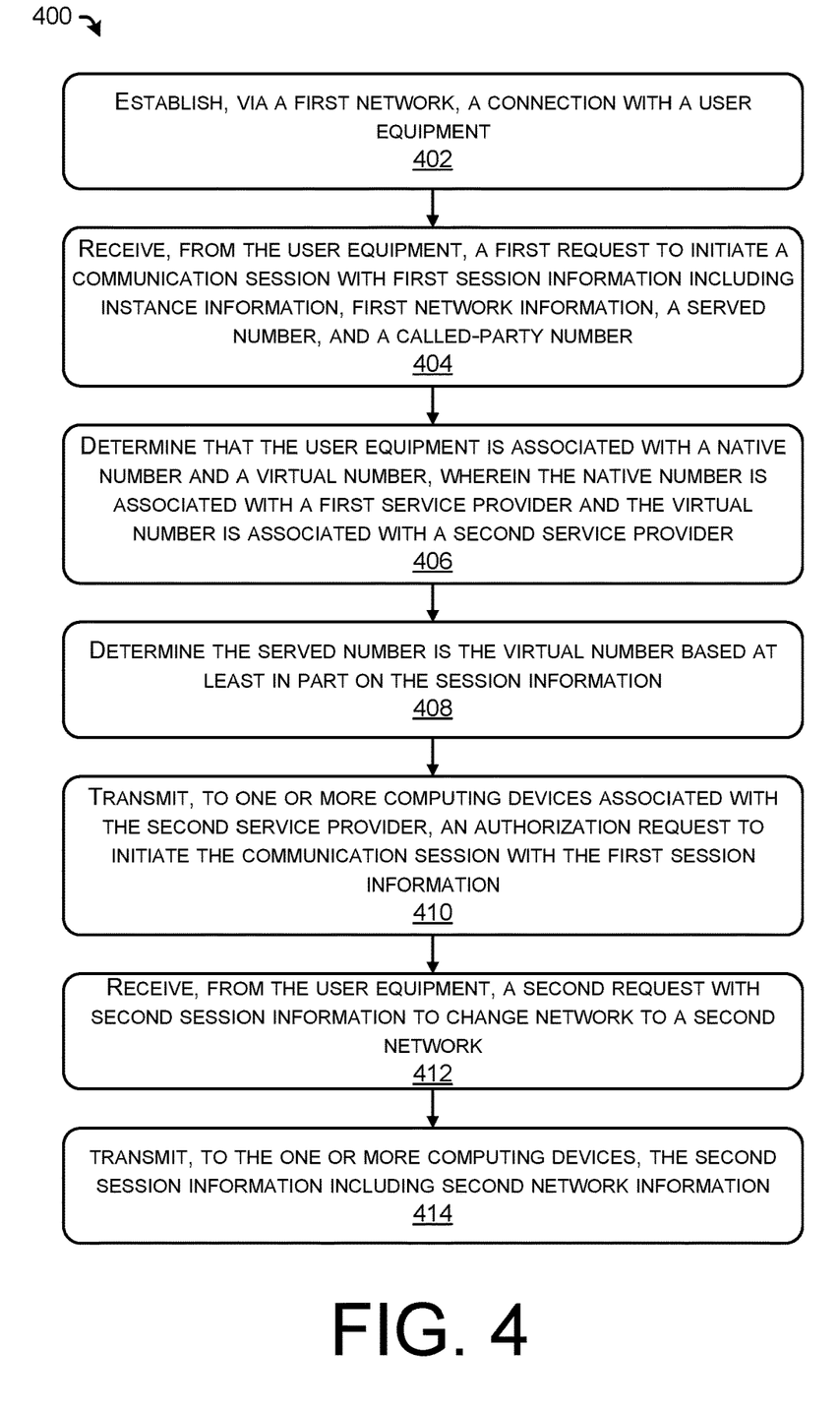
FIG. 4 illustrates an example process for online charging for multi-user agent instances served by an underlying telephony application server (U-TAS), according to some implementation.
Figure 5:
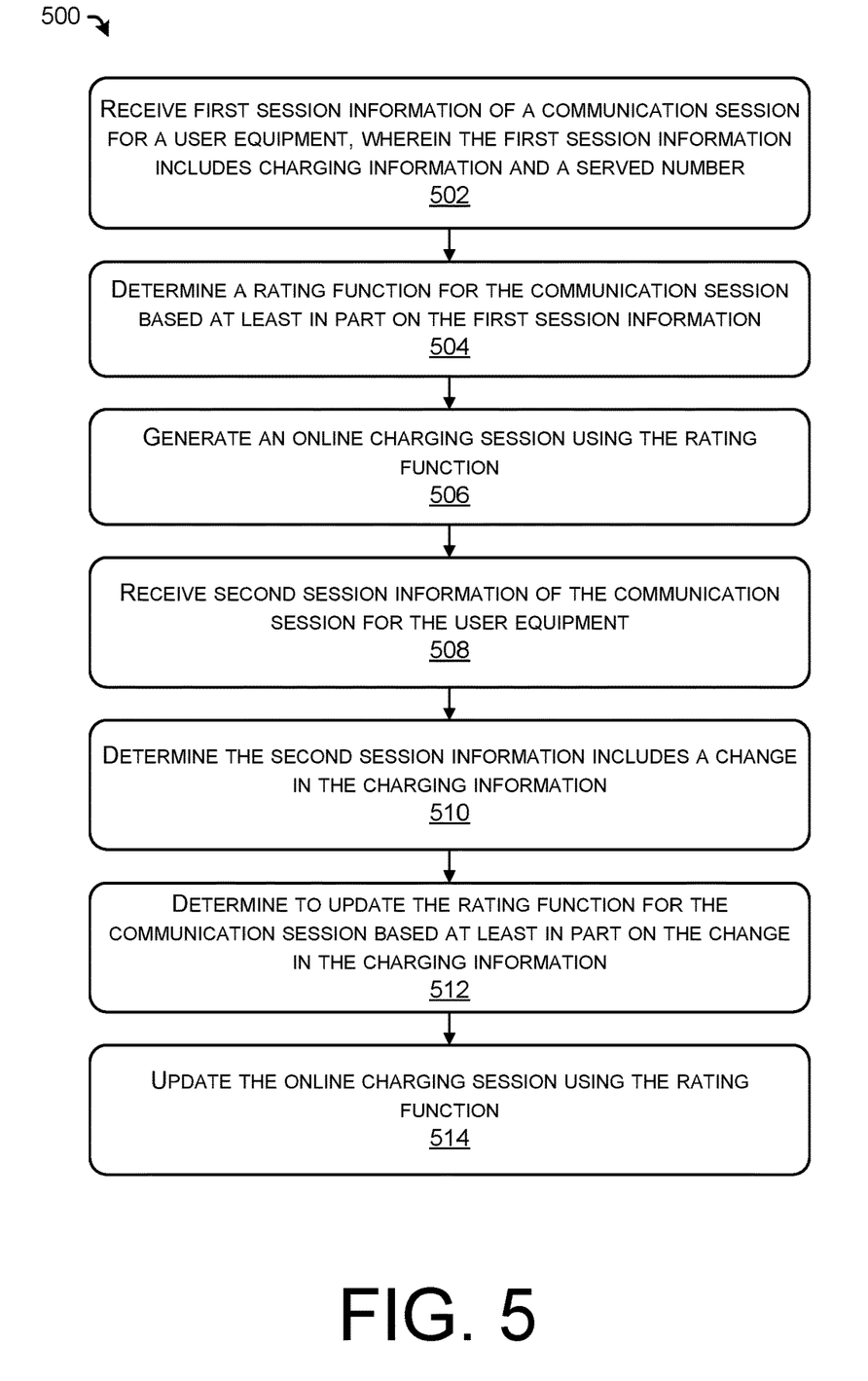
FIG. 5 illustrates an example process for online charging for multi-user agent instances served by a controller telephony application server (C-TAS), according to some implementation.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for online charging for multi-user agent instances served by an underlying telephony application server (U-TAS), in accordance with embodiments of the disclosure. The example process 400 can be performed by the server device 300 (or U-TAS 116 or another component), in connection with other components discussed herein. Some or all of the process 400 can be performed by one or more devices, equipment, or components illustrated in FIGS. 1-3, for example.

At operation 402, the process can include establishing, via a first network, a connection with a user equipment. The user equipment may include a native SIM number and may be associated with a service provider and may attempt to establish connection with an instant server associated with the service provider. In some instances, the instant server may receive communication from the user equipment to establish connection over a first network. The first network information may include information for the charging parameters including a first network type, a first visited network, and a time zone.

At operation 404, the process can include receiving, from the user equipment, a first request to initiate a communication session with first session information including first network information, a served number, and a called-party number. For example, the first session information may include a SIP message containing information for charging parameters to serve (e.g., initiate, receive, maintain, update, terminate, etc.) a communication session including but not limited to: virtual line association with native line information, SIP instance information, access network information, visited network information, user equipment time zone information, Cell Global Identity (CGI) of the device, International Mobile Equipment Identity (IMEI) of the device, called-party-address as Circuit-Switched Routing Number (CSRN), and session description protocol (SDP).

At operation 406, the process can include determining that the user equipment is associated with a native number and a virtual number, wherein the native number is associated with a first service provider and the virtual number is associated with a second service provider. At the operation 406, the instant server, associated with a service provider for the user equipment, can determine that the user equipment has a native number and the native number is associated with the service provider. In some instances, the instant server can determine that the user equipment has one or more virtual numbers associated with the user device and can determine that the one or more virtual numbers is associated with a different service provider.

At operation 408, the process can include determining that the served number is the virtual number based at least in part on the session information. In some instances, as discussed herein, a call may be served from the phone number that is native to the user device, or the user may select a virtual number to serve the call. In either case, the operation 408 would include determining the served number from the session information.

At operation 410, the process can include transmitting, to one or more computing devices associated with the second service provider, an authorization request to initiate the communication session with the first session information. In some instances, the operation 410 can determine that the served number is a virtual number and the virtual number is associated with a second service provider. The instant server may contact the server associated with the second service provider with an authorization request to initiate the communication session with the first session information.

At operation 412, the process can include receiving, from the user equipment, a second request with second session information to change network to a second network. In some instances, the request may include session information with information on one or more changes in charging parameters including but not limited to: virtual line association with native line information, SIP instance information, access network information, visited network information, user equipment time zone information, Cell Global Identity (CGI) of the user equipment, International Mobile Equipment Identity (IMEI) of the user equipment, called-party-address as Circuit-Switched Routing Number (CSRN), and session description protocol (SDP). For example, the operation 412 can include receiving information from the user equipment that the user equipment has moved from a first network to a second network and is requesting a hand-off.

At operation 414, the process can include transmitting, to the one or more computing devices, the second session information including second network information. For example, the second session information can include a change in the network information and can instruct the server to appropriately handle the charge session for the call. In some instances, the operation 414 can include contacting the one or more computing devices associated with the second service provider and providing the second session information.

FIG. 5 illustrates an example process for online charging for multi-user agent instances served by a controller telephony application server (C-TAS), in accordance with embodiments of the disclosure. The example process 500 can be performed by the server device 300 (or C-TAS 120, or another component), in connection with other components discussed herein. Some or all of the process 500 can be performed by one or more devices, equipment, or components illustrated in FIGS. 1-3, for example.

At operation 502, the process can include receiving first session information of a communication session for a user equipment, wherein the first session information includes charging information and served number. As discussed herein, in some instances, a server associated a virtual number may handle the charging session for a call while a native line server associated with the user equipment may handle underlaying call functions. To handle the charging session for the call, the operation 502 may receive the session information including charging information and a served number. The charging information may include information for charging parameters to serve (e.g., initiate, receive, maintain, update, terminate, etc.) a communication session as described herein.

At operation 504, the process can include determining a rating function for the communication session based at least in part on the first session information. As discussed herein, the rating function can determine the rate to charge an ongoing communication session based on one or more charging parameters. The one or more charging parameters may include one or more of: virtual line association with native line information, SIP instance information, access network information, visited network information, user equipment time zone information, Cell Global Identity (CGI) of the user equipment, International Mobile Equipment Identity (IMEI) of the user equipment, called-party-address as Circuit-Switched Routing Number (CSRN), and session description protocol (SDP). For example, the rate function may determine to charge a first rate based on the first access network type such as VoLTE and to charge a second rate based on the second access network type such as VoWifi, and the second rate may be lower than the first rate.

At operation 506, the process can include generating an online charging session using the rating function. In some instances, the instant server may act as a diameter client for the Ro interface which handles online charging sessions. The operation 506 may initiate the online charging session using the rating function.

At operation 508, the process can include receiving second session information of the communication session for the user equipment. As discussed herein, the server can receive ongoing session information for the communication session to update the charging session.

At operation 510, the process can include determining the second session information includes a change in the access network information. As discussed herein, the operation 510 can determine there is a change in the charging information to update the online charging session appropriately according the correct charging rule and rates.

At operation 512, the process can include determining to update the rating function for the communication session based at least in part on the change in the charging information. As a non-limiting example and described herein, the rate function may determine to charge a first rate based on the first access network type such as VoLTE and to charge a second rate based on the second access network type such as VoWifi, and the second rate may be lower than the first rate. Accordingly, at operation 512, the rating function may determine the current rate for the ongoing charging session based on the current access network type (e.g., VoLTE, VoNR, VoWifi, CS, etc.).

At operation 514, the process can include updating the online charging session using the rating function. As discussed herein, the charging function may use the current rate as determined by the rating function to determine an ongoing charge for the current communication session and charge the user account appropriately. The charging function may continuously determine if a call unit is available for the online charging session.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from one or more computing devices, first session information of a communication session for a user equipment, wherein the first session information includes charging information and a served number;
determining a rating function for the communication session based at least in part on the first session information;
generating an online charging session using the rating function;
receiving, from the one or more computing devices, second session information of the communication session for the user equipment;
determining that the second session information includes a change in the charging information;
determining to update the rating function for the communication session based at least in part on the change in the charging information;
determining to update the online charging session using the rating function;
receiving an incoming communication session request for the served number from a new caller; and
determining one or more user equipment associated with the served number to transmit call-forking information associated with the incoming communication session request.

2. The method of claim 1, wherein the one or more computing devices include a telephony application server (TAS) or a service centralization and continuity application server (SCCAS).

3. The method of claim 1, wherein the first session information is associated with a Packet Switched (PS) network type and the second session information is associated with a Circuit Switched (CS) network type.

4. The method of claim 1, further comprising:
receiving, from the one or more computing devices, a third request to initiate a conference session with third session information, the third session information including the charging information and the served number; and
generating a second online charging session using the rating function.

5. The method of claim 1, further comprising:
receiving, from the one or more computing devices, a termination request for the communication session; and
terminating the online charging session.

6. The method of claim 5, further comprising:
determining lack of call units based at least in part on the online charging session and the rating function;
determining to terminate the communication session based at least in part on the online charging session; and
transmitting, to the one or more computing devices, a termination request.

7. The method of claim 1, wherein the charging information includes one or of instance information, access network information, visited network information, a time zone of the user equipment, the served number, or a called-party number.

8. A system comprising:
one or more processors; and one or more computer-readable media storing instructions that, when executed by the one or more processors, cause the one or more processors to perform operations comprising:
  receiving, from one or more computing devices, first session information of a communication session for a user equipment, wherein the first session information includes charging information and a served number, and wherein the first session information is associated with a Packet Switched (PS) network type;
  determining a rating function for the communication session based at least in part on the first session information;
  generating an online charging session using the rating function;
  receiving, from the one or more computing devices, second session information of the communication session for the user equipment, wherein the second session information is associated with a Circuit Switched (CS) network type;
  determining that the second session information includes a change in the charging information;
  determining to update the rating function for the communication session based at least in part on the change in the charging information; and
  determining to update the online charging session using the rating function.

9. The system of claim 8, wherein the one or more computing devices include a telephony application server (TAS) or a service centralization and continuity application server (SCCAS).

10. The system of claim 8, the operations further comprising:
  receiving an incoming communication session request for the served number from a new caller; and
  determining one or more user equipment associated with the served number to transmit call-forking information associated with the incoming communication session request.

11. The system of claim 8, the operations further comprising:
  receiving, from the one or more computing devices, a third request to initiate a conference session with third session information, the third session information including the charging information and the served number; and
  generating a second online charging session using the rating function.

12. The system of claim 8, the operations further comprising:
  receiving, from the one or more computing devices, a termination request for the communication session; and
  terminating the online charging session.

13. The system of claim 12, the operations further comprising:
  determining lack of call units based at least in part on the online charging session and the rating function;
  determining to terminate the communication session based at least in part on the online charging session; and
  transmitting, to the one or more computing devices, a termination request.

14. The system of claim 8, wherein the charging information includes one or of instance information, access network information, visited network information, a time zone of the user equipment, the served number, or a called-party number.

15. A method comprising:
  receiving, from one or more computing devices, first session information of a communication session for a user equipment, wherein the first session information includes charging information and a served number;
  determining a rating function for the communication session based at least in part on the first session information;
  generating an online charging session using the rating function;
  receiving, from the one or more computing devices, second session information of the communication session for the user equipment;
  determining that the second session information includes a change in the charging information;
  determining to update the rating function for the communication session based at least in part on the change in the charging information;
  determining to update the online charging session using the rating function;
  receiving, from the one or more computing devices, a third request to initiate a conference session with third session information, the third session information including the charging information and the served number; and
  generating a second online charging session using the rating function.

16. The method of claim 15, wherein the one or more computing devices include a telephony application server (TAS) or a service centralization and continuity application server (SCCAS).

17. The method of claim 15, further comprising:
  receiving an incoming communication session request for the served number from a new caller; and
  determining one or more user equipment associated with the served number to transmit call-forking information associated with the incoming communication session request.

18. The method of claim 15, wherein the first session information is associated with a Packet Switched (PS) network type and the second session information is associated with a Circuit Switched (CS) network type.

19. The method of claim 15, further comprising:
  receiving, from the one or more computing devices, a termination request for the communication session; and
  terminating the online charging session.

20. The method of claim 19, further comprising:
  determining lack of call units based at least in part on the online charging session and the rating function;
  determining to terminate the communication session based at least in part on the online charging session; and
  transmitting, to the one or more computing devices, a termination request.

\* \* \* \* \*